US012249158B2

(12) United States Patent
Chang et al.

(10) Patent No.: US 12,249,158 B2
(45) Date of Patent: Mar. 11, 2025

(54) OBJECT DETECTION METHOD

(71) Applicant: Automotive Research & Testing Center, Lugong (TW)

(72) Inventors: Yun-Ling Chang, Lugong (TW); Yi-Feng Su, Lugong (TW); Ying-Ren Chen, Lugong (TW)

(73) Assignee: AUTOMOTIVE RESEARCH & TESTING CENTER, Lugong (TW)

( * ) Notice: Subject to any disclaimer, the term of this patent is extended or adjusted under 35 U.S.C. 154(b) by 674 days.

(21) Appl. No.: 17/644,537

(22) Filed: Dec. 15, 2021

(65) Prior Publication Data
US 2023/0186642 A1 Jun. 15, 2023

(51) Int. Cl.
*G06V 20/58* (2022.01)
*G01S 17/89* (2020.01)
*G06T 7/246* (2017.01)
*G06T 7/277* (2017.01)
*G06T 7/33* (2017.01)

(52) U.S. Cl.
CPC .............. *G06V 20/58* (2022.01); *G01S 17/89* (2013.01); *G06T 7/248* (2017.01); *G06T 7/277* (2017.01); *G06T 7/337* (2017.01); *G06T 2207/20212* (2013.01)

(58) Field of Classification Search
CPC ...... G06V 20/58; G06V 10/44; G06V 10/764; G06V 10/803; G01S 17/89; G01S 7/417; G01S 7/4802; G01S 13/865; G01S 13/867; G01S 17/86; G01S 17/931; G06T 7/248; G06T 7/277; G06T 7/337; G06T 2207/20212; G06T 2207/10016; G06T 2207/10028; G06T 2207/20081; G06T 2207/30252; G06T 7/38
See application file for complete search history.

(56) References Cited

U.S. PATENT DOCUMENTS

| 9,097,800 | B1 | 8/2015 | Zhu |
| 10,101,747 | B2 | 10/2018 | Tascione et al. |
| 10,999,511 | B2 | 5/2021 | Yang et al. |
| 2017/0206464 | A1 | 7/2017 | Clayton et al. |
| 2019/0180467 | A1* | 6/2019 | Li .................... G01S 17/93 |

FOREIGN PATENT DOCUMENTS

| CN | 111709343 A | 9/2020 |
| TW | I702568 B | 8/2020 |

* cited by examiner

*Primary Examiner* — Vu Le
*Assistant Examiner* — Valenteana Shlommit Fung
(74) *Attorney, Agent, or Firm* — HSML P.C.

(57) ABSTRACT

An object detection method includes steps that are to be performed for each piece of point cloud data received from a lidar module, of selecting a first to-be-combined image from among images received from a camera device that corresponds in time to the piece of point cloud data, selecting a second to-be-combined image from among the images that is the $N^{th}$ image before the first to-be-combined image in the time order, combining the first to-be-combined image and the second to-be-combined image to generate a combined image, generating a result image by incorporating the piece of point cloud data into the combined image, and inputting the result image into a trained machine learning model in order to determine a class to which each object in the result image belongs.

9 Claims, 8 Drawing Sheets

OBJECT DETECTION METHOD

FIELD

The disclosure relates to object detection, and more particularly to an object detection method that combines multiple sensor data sources.

BACKGROUND

A conventional method for detecting objects that obstruct a route of a moving carrier device, such as an autonomous mobile robot (AMR) or a self-driving car, utilizes heterogeneous multi-sensor fusion that involves multiple data sources, such as radar, lidar and camera, to detect the objects, so that collision between the objects and the carrier device may be avoided. The different sensor data sources each obtain a different kind of data at a different frequency. For example, the radar may generate a piece of radar data every 50 milliseconds (ms), the lidar may generate a piece of point cloud data every 100 ms, and the camera may generate an image every 33 ms. Due to the difference in the sampling frequencies, the different kinds of data obtained from the multiple sensors are not synchronized in time, which means that the different kinds of data are not generated with respect to a same space at a same time point. Such asynchronization in both space and time among the multiple kinds of data adversely affects the accuracy for detecting the obstacle objects.

SUMMARY

Therefore, an object of the disclosure is to provide an object detection method that can alleviate the adverse effect brought about by asynchronization in both space and time among multiple kinds of data that are generated by multiple sensor data sources.

According to one aspect of the disclosure, the object detection method is to be performed by a computing device which is in communication with a camera device and a lidar module that are positioned on a carrier device. The camera device is configured to continuously capture a series of images showing a scene which is in a vicinity of the carrier device and which includes at least one object. The lidar module is configured to continuously scan the scene in the vicinity of the carrier device to generate in series multiple pieces of point cloud data representing the scene. The computing device is configured to receive the images from the camera device and to receive the pieces of point cloud data from the lidar module. The object detection method includes following steps that are to be performed with respect to each of the pieces of point cloud data after the piece of point cloud data is received from the lidar module: selecting a first to-be-combined image from among the images that have been received from the camera device, wherein the first to-be-combined image corresponds in time to the piece of point cloud data; selecting a second to-be-combined image from among the images that have been received from the camera device, wherein the second to-be-combined image is the N image before the first to-be-combined image in the time order of image capture, and N is an integer that is no less than three; combining the first to-be-combined image and the second to-be-combined image to generate a combined image; generating a result image by incorporating the piece of point cloud data into the combined image; and inputting the result image into a trained machine learning model in order to determine a class to which each object shown in the result image belongs.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
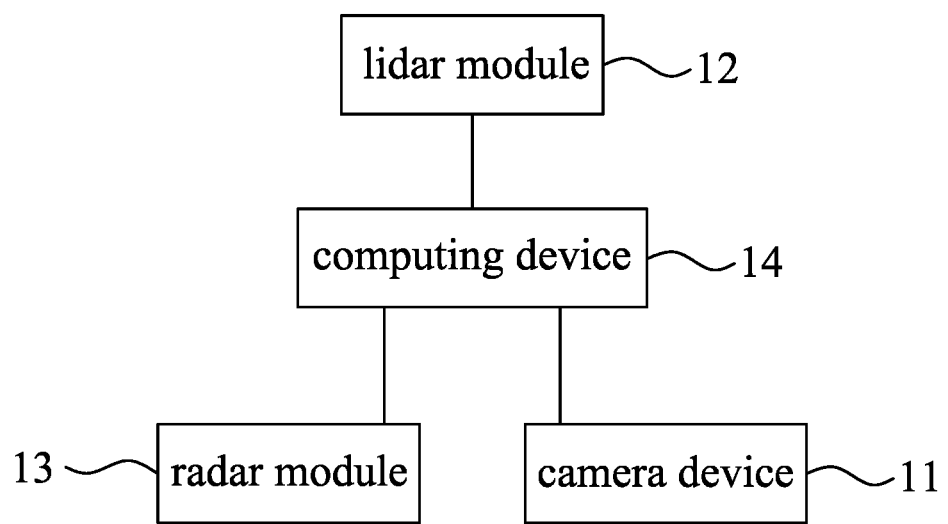
FIG. 1 is a block diagram that exemplarily illustrates an object detection system according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

FIG. 1 exemplarily illustrates an object detection system according to an embodiment of the disclosure. The object detection system includes a camera device 11, a lidar module 12, a radar module 13 and a computing device 14 that is electrically connected to and in communication with the camera device 11, the lidar module 12 and the radar module 13. The object detection system is to be positioned on a carrier device, such as a vehicle.

The camera device 11 is configured to continuously capture a series of images of a scene in the vicinity of the carrier device, on which the object detection system is positioned. The scene may include at least one object. According to some embodiments, the camera device 11 may be a camera. In an embodiment, the camera device 11 is a camera that captures an image every 33 ms.

The lidar module 12 is configured to continuously scan the scene in the vicinity of the carrier device to generate in series multiple pieces of point cloud data representing the scene. According to some embodiments, the lidar module 12 may be a lidar sensor. In an embodiment, the lidar module 12 is a lidar sensor that generates a piece of point cloud data every 100 ms by scanning the scene from right to left.

The radar module 13 is configured to continuously scan the scene in the vicinity of the carrier device to generate in series multiple pieces of radar data representing the scene.

According to some embodiments, the radar module 13 may be a radar sensor. In an embodiment, the radar module 13 is a radar sensor that generates a piece of radar data every 50 ms.

The camera device 11, the lidar module 12 and the radar module 13 in some embodiments capture and scan the scene in front of the carrier device, but may capture and scan the scene surrounding the carrier device in other embodiments.

The computing device 14 is configured to receive the images from the camera device 11, the pieces of point cloud data from the lidar module 12, and the pieces of radar data from the radar module 13. According to some embodiments, the computing device 14 may be a processor, a micro processor or another type of computing chip.

The object detection system is configured to perform an object detection method when being positioned on a moving carrier device. The object detection method includes a first procedure and a second procedure. The first procedure is related to the pieces of point cloud data from the lidar module 12 and the pieces of radar data from the radar module 13. The second procedure is related to the pieces of point cloud data from the lidar module 12 and the images from the camera device 11. Each time the computing device 14 receives a piece of point cloud data from the lidar module 12, the object detection system performs the first procedure and the second procedure.

Figure 2:
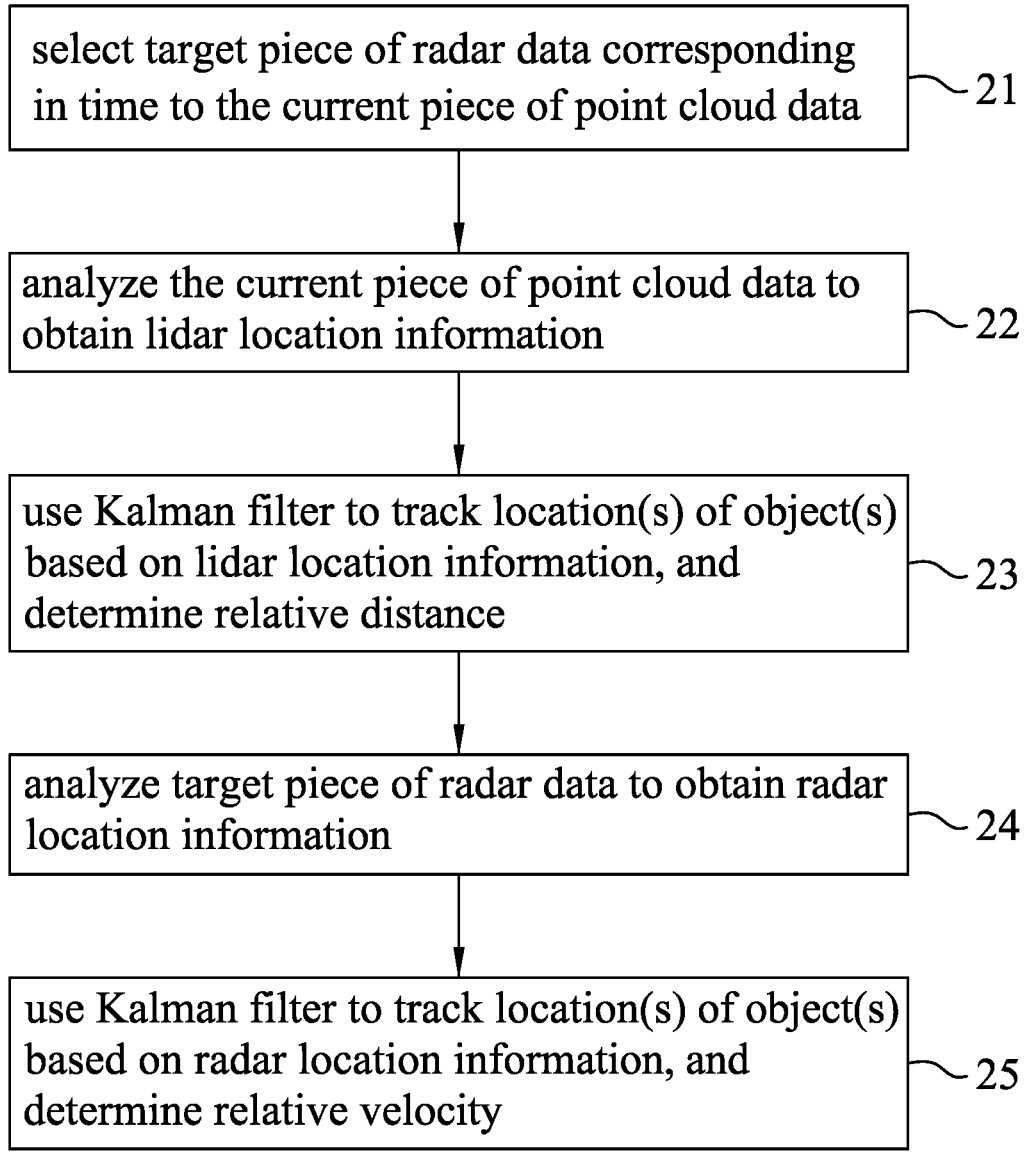
FIG. 2 is a flow chart that exemplarily illustrates a first procedure of an object detection method according to an embodiment of the disclosure.

FIG. 2 exemplarily illustrates the first procedure that is to be performed in response to the computing device 14 receiving a piece of point cloud data from the lidar module 12 according to an embodiment of the disclosure. The first procedure includes Steps 21-25, in which the piece of point cloud data that causes these steps to be performed is referred to as "the current piece of point cloud data".

Figure 3:
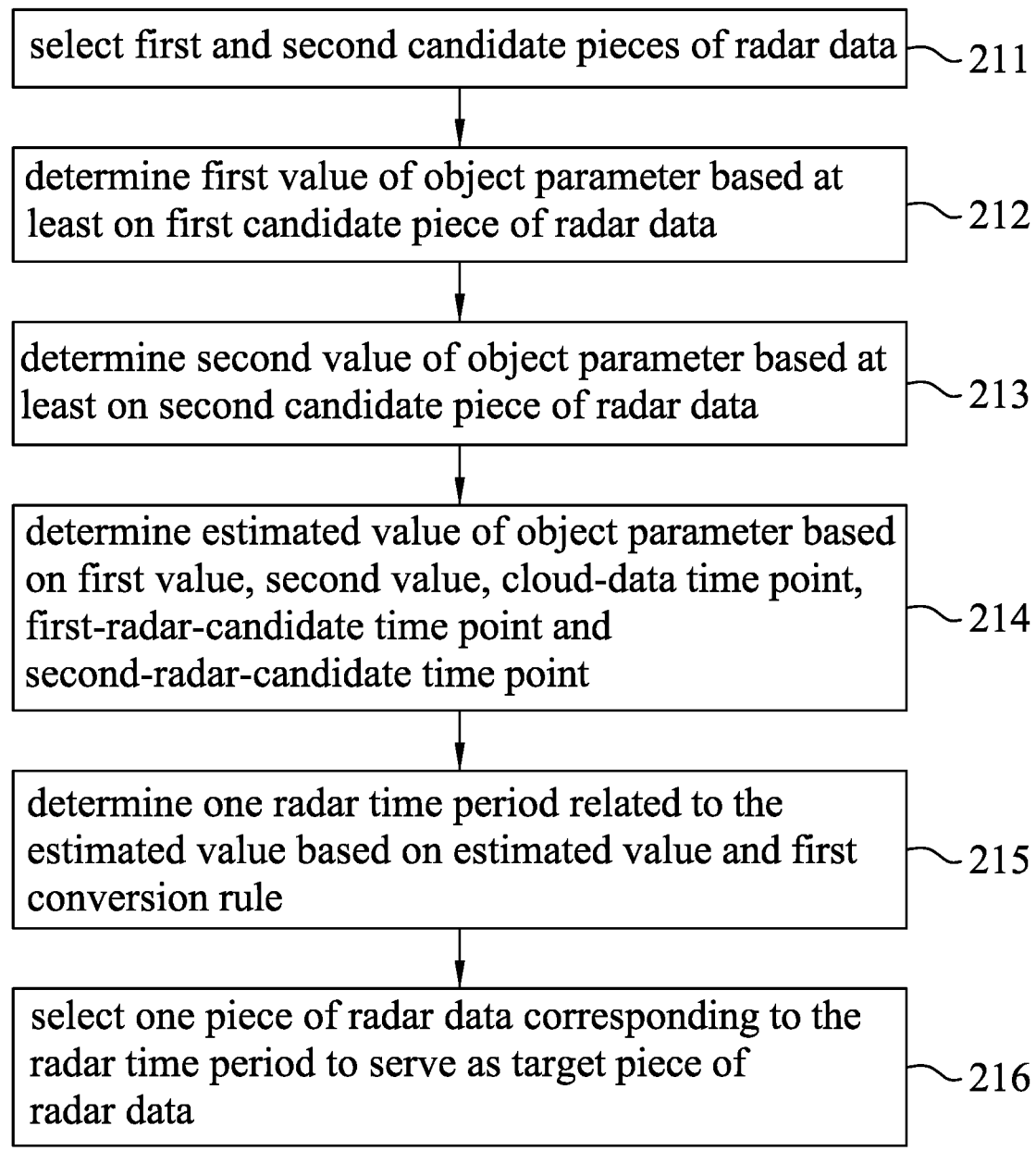
FIG. 3 is a flow chart that exemplarily illustrates sub-steps of Step 21 of the first procedure according to an embodiment of the disclosure.

In Step 21, for the current piece of point cloud data, the computing device 14 selects a target piece of radar data from among the pieces of radar data that the computing device 14 has received from the radar module 13, where the target piece of radar data corresponds in time to the current piece of point cloud data. Specifically, Step 21 includes Sub-steps 211-216 that are illustrated in FIG. 3 and that are to be performed with respect to the current piece of point cloud data.

In Sub-step 211, the computing device 14 selects a first candidate piece of radar data and a second candidate piece of radar data from among the pieces of radar data that have been received from the radar module 13. The first candidate piece of radar data is one of the pieces of radar data that the radar module 13 generated at a time point (also referred to as "first-radar-candidate time point" hereinafter) which is before and nearest to a time point (also referred to as "cloud-data time point" hereinafter), at which the lidar module 12 generates the current piece of point cloud data. The second candidate piece of radar data is the previous one piece of radar data before the first candidate piece of radar data in the time order of radar data generation. A time point at which the radar module 13 generates the second candidate piece of radar data is referred to as "second-radar-candidate time point" hereinafter.

In Sub-step 212, the computing device 14 determines, based at least on the first candidate piece of radar data, a first value of an object parameter that is related to one of the at least one object (also referred to as "reference object" hereinafter) in the scene in the vicinity of the carrier device. According to some embodiments, the object parameter may be, but is not limited to, a distance of the reference object from the carrier device, a relative position of the reference object with respect to the carrier device, or a relative velocity of the reference object with respect to the carrier device. Deriving information about the distance, the relative position and the relative velocity from the pieces of radar data is known in the art, and is not described here.

In Sub-step 213, the computing device 14 determines, based at least on the second candidate piece of radar data, a second value of the object parameter that is related to the reference object in the scene.

In Sub-step 214, the computing device 14 determines an estimated value of the object parameter that corresponds to the cloud-data time point, at which the current piece of point cloud data is generated by the lidar module 12. Specifically, the estimated value is determined based on the cloud-data time point, the first-radar-candidate time point, the second-radar-candidate time point, the first value determined in step 212 and the second value determined in step 213. In some embodiments where the object parameter is the distance of the reference object from the carrier device, the estimated value is derived by using a formula of:

$$f_R(t) = f_R(t_{-1}) + \frac{f_R(t_{-1}) - f_R(t_{-2})}{t_{-1} - t_{-2}}(t - t_{-1}) + \varepsilon_1,$$

wherein $f_R(t)$ is the estimated value, $f_R(t_{-1})$ is the first value, $f_R(t_{-2})$ is the second value, $t_{-1}$ is the first-radar-candidate time point, $t_{-2}$ is the second-radar-candidate time point, t is the cloud-data time point, and $\varepsilon_1$ is a truncation error. The value of the truncation error $\varepsilon_1$ may be determined in advance by experiments.

Figure 4:
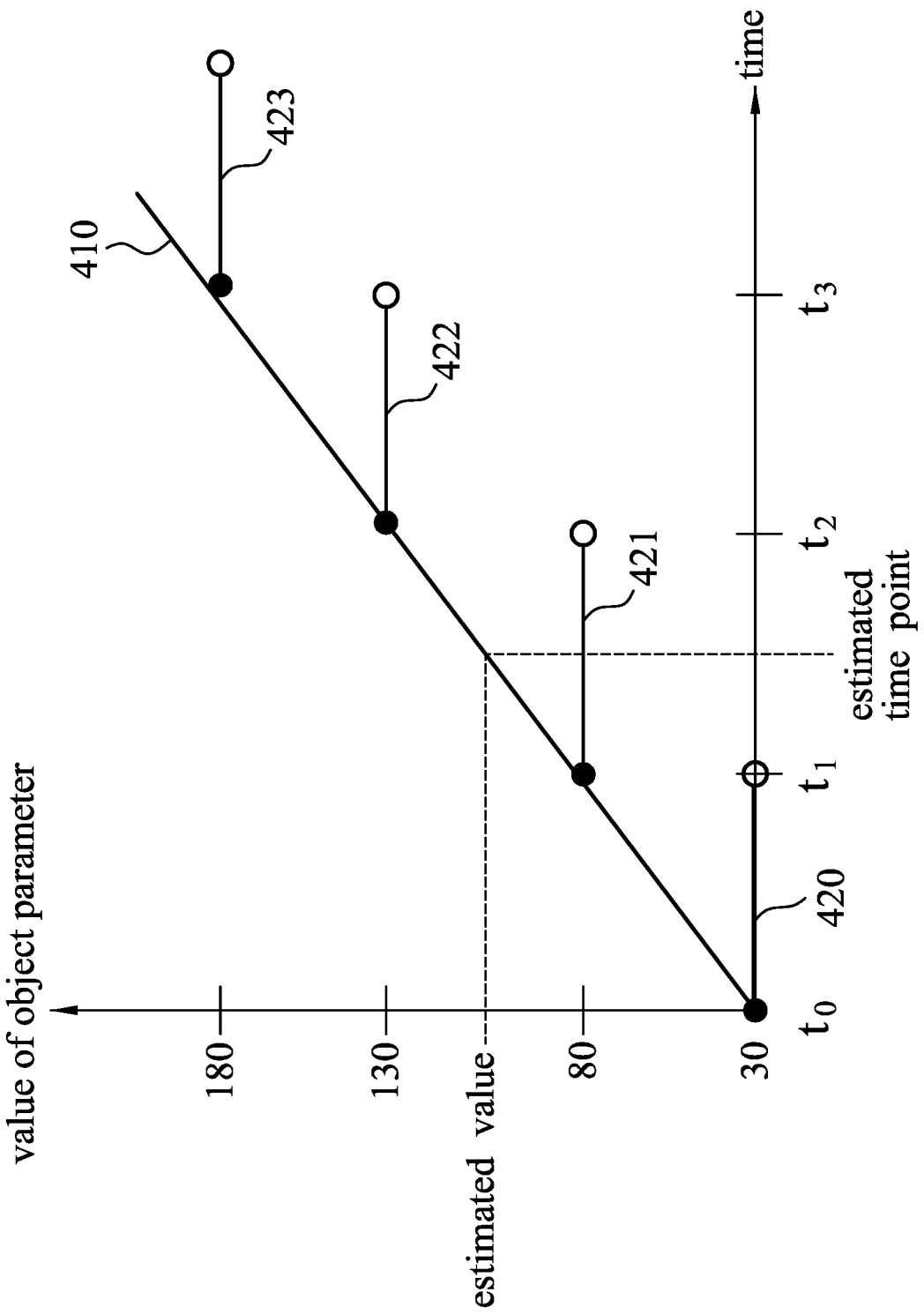
FIG. 4 is a schematic diagram that exemplarily illustrates a first conversion rule and radar time periods according to an embodiment of the disclosure.

In Sub-step 215, the computing device 14 determines, based on the estimated value of the object parameter and a first conversion rule that defines a relationship between the object parameter and time, one radar time period that relates to the estimated value. Specifically, the pieces of radar data generated by the radar module 13 respectively correspond to different radar time periods. A radar time period that corresponds to a piece of radar data is determined as a time period which starts from a time point at which the radar module 13 generates the piece of radar data and ends exactly before the radar module 13 generates a next piece of radar data. Moreover, the computing device 14 determines an estimated time point based on the estimated value and the first conversion rule, and then determines the one radar time period from among the radar time periods that the estimated time point falls within. The first conversion rule is a function of the object parameter and is derived based on the time points respectively at which the pieces of radar data are generated by the radar module 13 and based on values of the object parameter that are respectively determined with respect to the pieces of radar data. FIG. 4 graphically illustrates an example of the first conversion rule 410 and the radar time periods 420-423 according to an embodiment of the disclosure, wherein the radar time periods 420-423 correspond respectively to four pieces of radar data that are sequentially generated by the radar module 13 respectively at time points $t_0$, $t_1$, $t_2$ and $t_3$. For the estimated value of the object parameter exemplarily shown in FIG. 4, the radar time period 421 is determined.

In Sub-step 216, the computing device 14 selects one of the pieces of radar data received from the radar module 13 that corresponds to the radar time period determined in Sub-step 215 to serve as the target piece of radar data. It can be appreciated that Sub-steps 211-216 may effectively determine the target piece of radar data that is the one which is most consistent in time with the current piece of point cloud data, regardless of what sampling frequencies the lidar module 12 and the radar module 13 use, and regardless of when the lidar module 12 and the radar module 13 start to scan the scene. The target piece of radar data thus selected represents an instance of the scene that is closet in time to the instance of the scene represented by the current piece of point cloud data.

Returning to FIG. 2, in Step 22, the computing device 14 analyzes the current piece of point cloud data by using an oriented bounding box algorithm, which may be based on principal component analysis (PCA), to obtain lidar location information with respect to the at least one object in the scene that is scanned by the lidar module 12 and recorded in the current piece of point cloud data. The lidar location information indicates a location of each of the at least one object in the scene that is derived from the current piece of point cloud data.

In Step 23, the computing device 14 uses a Kalman filter to track, for each of the at least one object, a location of the object based on the lidar location information obtained for the current piece of point cloud data and the lidar location information obtained previously for each of at least one piece of point cloud data that was received prior to the current piece of point cloud data (referred to as "at least one previous piece of point cloud data"), and determines, for each of the at least one object, a relative distance of the object from the carrier device based on the location of the object thus tracked. It is noted that the location of the object tracked by using the Kalman filter based on the lidar location information is more accurate compared to the location of the object indicated by the lidar location information.

In Step 24, the computing device 14 analyzes the target piece of radar data that has been selected for the current piece of point cloud data in Step 21 by using the oriented bounding box algorithm to obtain radar location information with respect to the at least one object in the scene that is scanned by the radar module 13 and recorded in the target piece of radar data. The radar location information indicates a location of each of the at least one object that is derived from the target piece of radar data.

In Step 25, the computing device 14 uses the Kalman filter to track, for each of the at least one object, a location of the object based on the radar location information obtained with respect to the current piece of point cloud data and the radar location information obtained previously with respect to each of the at least one previous piece of point cloud data, and determines, for each of the at least one object, a relative velocity of the object with respect to the carrier device based on the location of the object thus tracked. It is noted that the location of the object tracked by using the Kalman filter based on the radar location information is more accurate compared to the location of the object indicated by the radar location information.

Alterations may be made to the first procedure shown in FIG. 2 with more variant embodiments going beyond the disclosure. For example, Steps 24 and 25 are not necessarily performed after Steps 22 and 23. Instead, Steps 24 and 25 may be performed before Steps 22 and 23, or performed in parallel with Steps 22 and 23.

Figure 5:
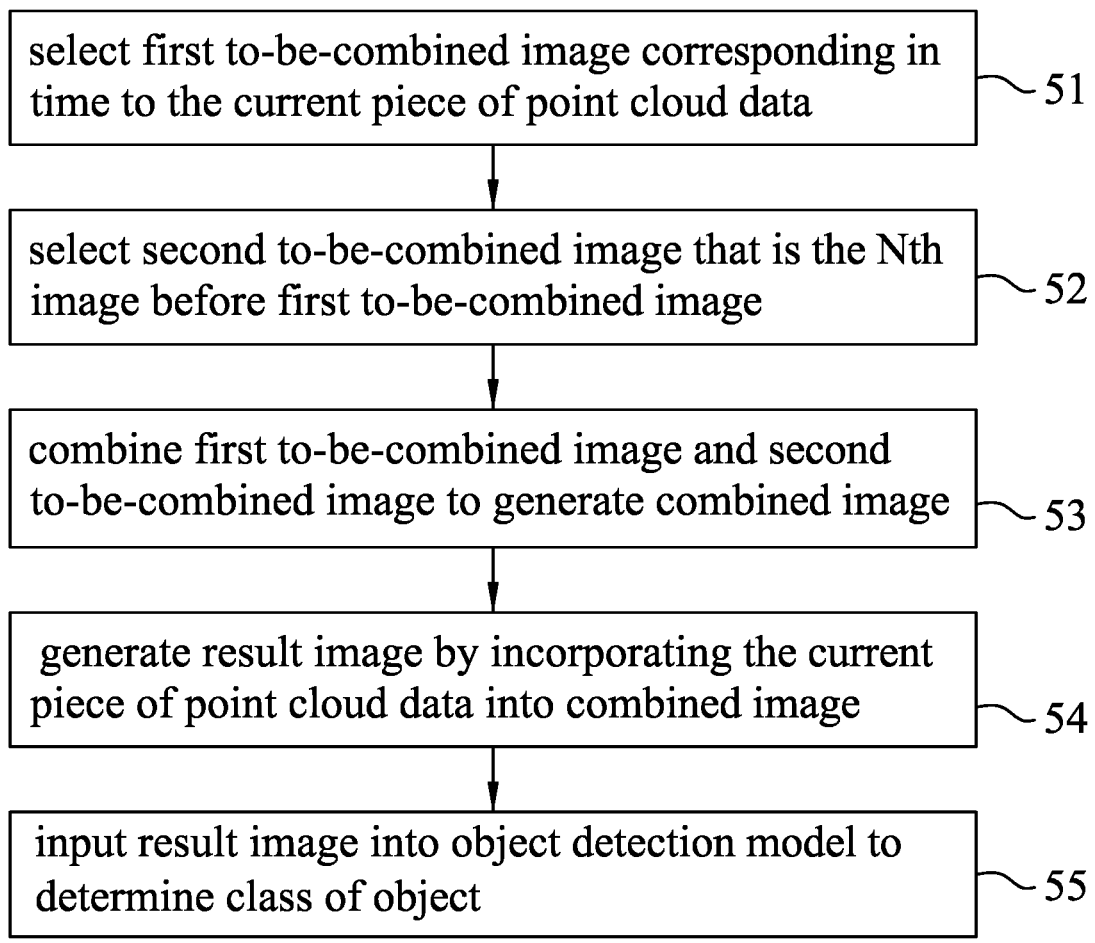
FIG. 5 is a flow chart that exemplarily illustrates a second procedure of the object detection method according to an embodiment of the disclosure.

FIG. 5 exemplarily illustrates the second procedure of the object detection method that is to be performed in response to the computing device 14 receiving a piece of point cloud data from the lidar module 12 according to an embodiment of the disclosure. The second procedure includes Steps 51-55, in which the piece of point cloud data that causes these steps to be performed is also referred to as "the current piece of point cloud data". The second procedure may be performed before, after or simultaneously with the first procedure.

Figure 6:
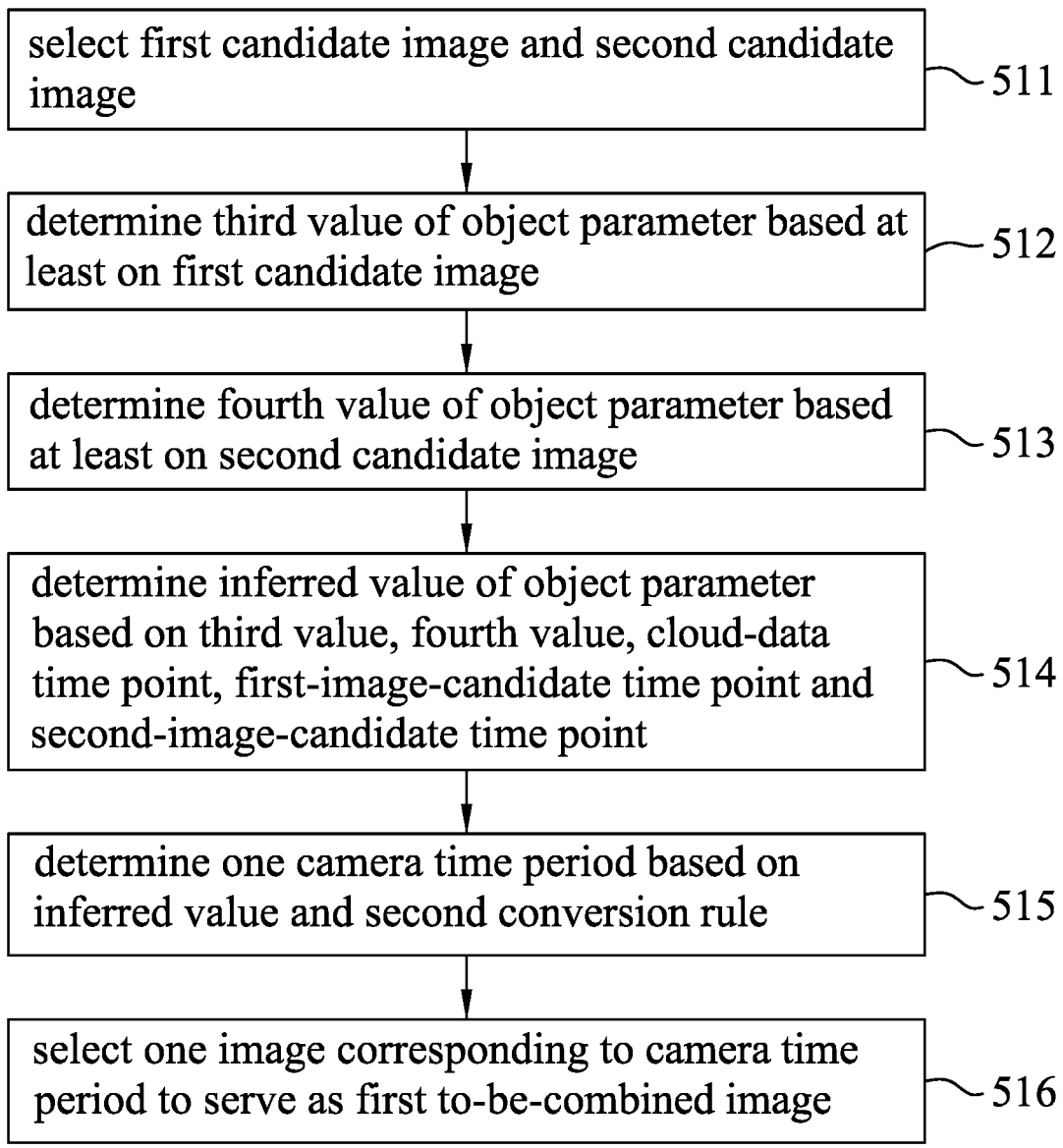
FIG. 6 is a flow chart that exemplarily illustrates sub-steps of Step 51 of the second procedure according to an embodiment of the disclosure.

In Step 51, for the current piece of point cloud data, the computing device 14 selects a first to-be-combined image from among the images that the computing device 14 has received from the camera device 11, where the first to-be-combined image corresponds in time to the current piece of point cloud data. Specifically, Step 51 includes Sub-steps 511-516 that are illustrated in FIG. 6 and that are to be performed with respect to the current piece of point cloud data.

In Sub-step 511, the computing device 14 selects a first candidate image and a second candidate image from among the images that have been received from the camera device 11. The first candidate image is one of the images that is captured by the camera device 11 at a time point (referred to as "first-image-candidate time point" hereinafter) which is before and nearest to the cloud-data time point, at which the lidar module 12 generates the current piece of point cloud data. The second candidate image is the previous one image before the first candidate image in the time order as to when the images are captured. A time point at which the camera device 11 generates the second candidate image is referred to as "second-image-candidate time point" hereinafter.

In Sub-step 512, the computing device 14 determines, based at least on the first candidate image, a third value of the object parameter that is related to the reference object in the scene in the vicinity of the carrier device.

In Sub-step 513, the computing device 14 determines a fourth value of the object parameter based at least on the second candidate image.

In cases where the object parameter is the relative position of the reference object with respect to the carrier device, deriving information about the relative position from the first and second candidate images is known in the art. In some embodiments where the object parameter is the distance of the reference object from the carrier device or the relative velocity of the reference object with respect to the carrier device, the third and fourth values may be derived from the first and second candidate images based on a focal length of a lens used by the camera device 11, and may be further based on a camera model formula that is derived from a pinhole camera model for calibration of the camera device 11, but other known methods for finding distances and/or relative velocities from images may also be utilized.

In Sub-step 514, the computing device 14 determines an inferred value of the object parameter that corresponds to the cloud-data time point, at which the current piece of point cloud data is generated by the lidar module 12. Specifically, the estimated value is determined based on the cloud-data time point, the first-image-candidate time point, the second-image-candidate time point, the third value determined in step 512 and the fourth value determined in step 513. In some embodiments where the object parameter is the distance of the reference object from the carrier device, the inferred value is derived by using a formula of:

$$f_I(t) = f_I(t'_{-1}) + \frac{f_I(t'_{-1}) - f_I(t'_{-2})}{t'_{-1} - t'_{-2}}(t - t'_{-1}) + \varepsilon_2$$

wherein $f_I(t)$ is the inferred value, $f_I(t'_{-1})$ is the third value, $f_I(t'_{-2})$ is the fourth value, $t'_{-1}$ is the first-image-candidate time point, $t'_{-2}$ is the second-image-candidate time point, t is the cloud-data time point, and $\varepsilon_2$ is another truncation error which may be determined in advance by experiments.

Figure 7:
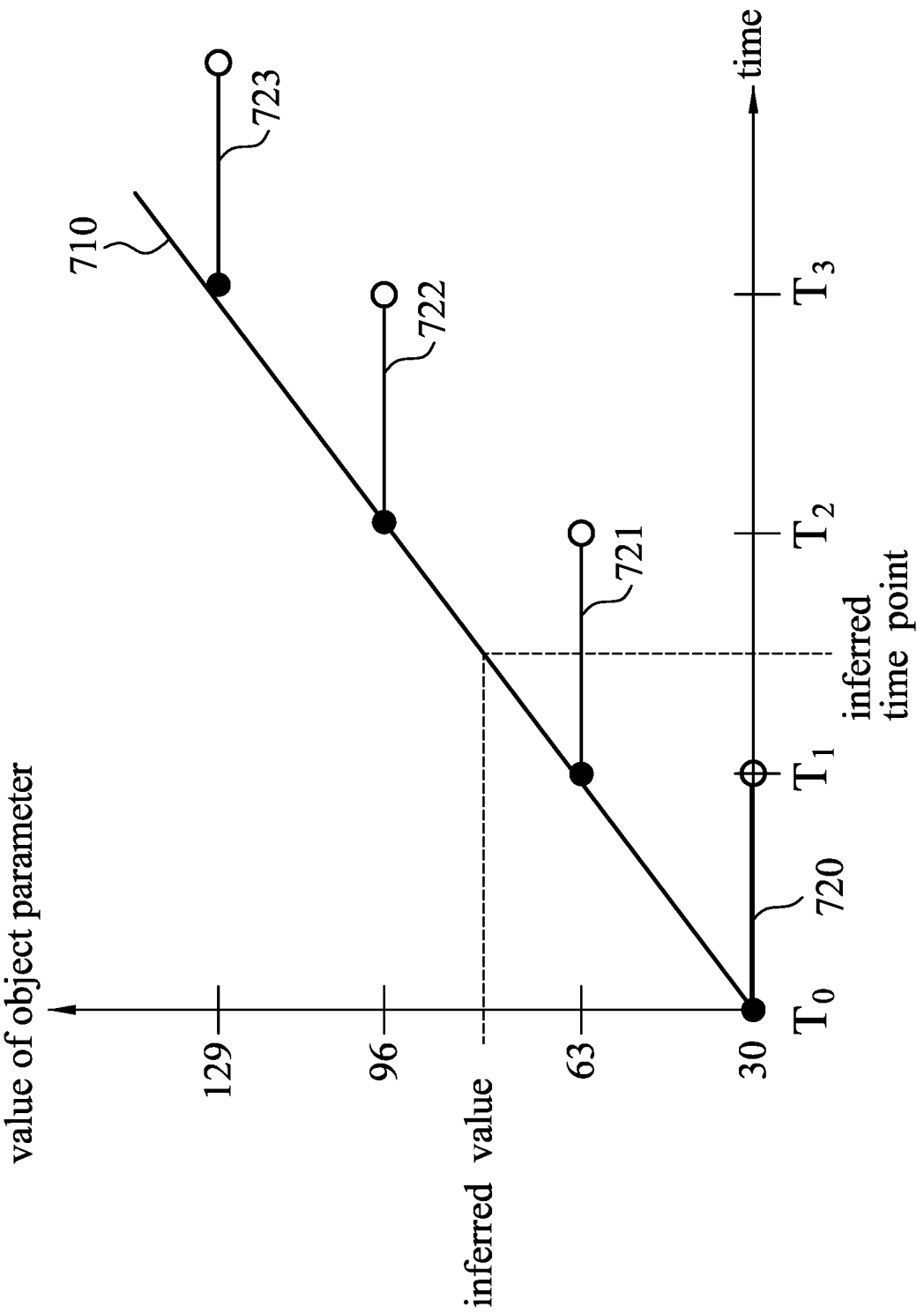
FIG. 7 is a schematic diagram that exemplarily illustrates a second conversion rule and camera time periods according to an embodiment of the disclosure.

In Sub-step 515, the computing device 14 determines, based on the inferred value of the object parameter and a second conversion rule that defines a relationship between the object parameter and time, one camera time period that relates to the inferred value. Specifically, the images captured by the camera device 11 respectively correspond to different camera time periods. A camera time period that corresponds to an image is determined as a time period which starts from a time point at which the image was captured by the camera device 11 and ends exactly before the camera device 11 captured a next image. Moreover, the computing device 14 determines an inferred time point based on the inferred value and the second conversion rule, and then determines the one camera time period from among the camera time periods that the inferred time point falls within. The second conversion rule is a function of the object parameter and is derived based on the time points respectively at which the images are captured by the camera device 11 and based on values of the object parameter that are respectively determined with respect to the images. FIG. 7 graphically illustrates an example of the second conversion rule 710 and the camera time periods 720-723 according to an embodiment of the disclosure, wherein the camera time periods 720-723 correspond respectively to four images that are sequentially captured by the camera device 11 respectively at time points $T_0$, $T_1$, $T_2$ and $T_3$. For the inferred value of the object parameter exemplarily shown in FIG. 7, the camera time period 721 is determined.

In Sub-step 516, the computing device 14 selects one of the images received from the camera device 11 that corresponds to the camera time period determined in Sub-step 515 to serve as the first to-be-combined image. It can be appreciated that Sub-steps 511-516 may effectively determine the first to-be-combined image that is the one of the images which is most consistent in time with the current piece of point cloud data, regardless of what sampling frequencies the camera device 11 and the lidar module 12 use, and regardless of when the camera device 11 and the lidar module 12 start to photograph and scan the scene.

Returning to FIG. 5, in Step 52, for the current piece of point cloud data, the computing device 14 selects a second to-be-combined image from among the images that the computing device 14 has received from the camera device 11. The second to-be-combined image is the $N^{th}$ image before the first to-be-combined image in the time order of the image capture. In an embodiment, N equals three. In some other embodiments, N is an integer larger than three.

In Step 53, the computing device 14 combines the first to-be-combined image and the second to-be-combined image to generate a combined image with respect to the current piece of point cloud data. In some embodiments, the computing device 14 stitches a portion of the first to-be-combined image with a portion of the second to-be-combined image in order to generate the combined image. In an embodiment where the lidar module 12 scans the scene in the direction from right to left, the computing device 14 stitches the left half of the first to-be-combined image with the right half of the second to-be-combined image (which is captured earlier than the first to-be-combined image) to generate the combined image, so that the content of the combined image may be more consistent in both time and space with the content of the current piece of point cloud data, which has data reflecting the right portion of the scene that is scanned/obtained earlier and has data reflecting the left portion of the scene that is scanned/obtained later.

Figure 8:
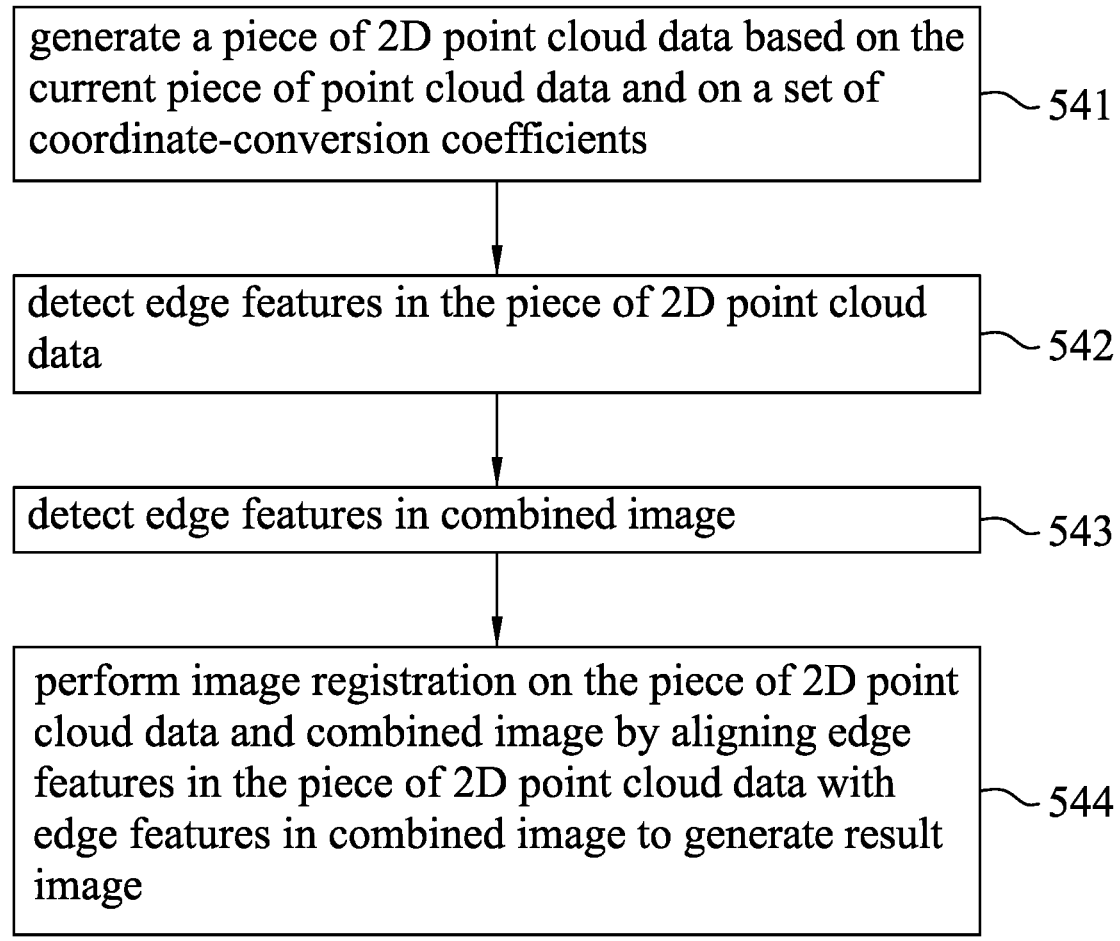
FIG. 8 is a flow chart that exemplarily illustrates sub-steps of Step 54 of the second procedure according to an embodiment of the disclosure.

In Step 54, the computing device 14 generates a result image with respect to the current piece of point cloud data by incorporating the current piece of point cloud data into the combined image. Specifically, Step 54 includes Sub-steps 541-544 illustrated in FIG. 8.

In Sub-step 541, the computing device 14 generates a piece of two-dimensional (2D) point cloud data based on the current piece of point cloud data and on a set of coordinate-conversion coefficients. According to some embodiments, the generating of the 2D point cloud data may involve dimension reduction using PCA. The set of conversion coefficients is related to a point cloud coordinate system associated with the pieces of point cloud data generated by the lidar module 12 and is related to an image pixel coordinate system associated with the images captured by the camera device 11. The set of conversion coefficients includes an intrinsic matrix and an extrinsic matrix. The intrinsic matrix can be derived based on the focal length (in pixels) of the camera device 11 and a set of central coordinates of the images generated by the camera device 11. The extrinsic matrix can be derived based on a relative position of the lidar module 12 with respect to the position of the camera device 11.

Transforming the current piece of point cloud data into the piece of 2D point cloud data may be achieved by known art, e.g., the technology of Camera Calibration Toolbox for Matlab described on the website www.vision.caltech.edu. According to some embodiments, the piece of 2D point cloud data may be an image that includes multiple points which represent object(s) detected by the lidar module 12 and represented in the current piece of point cloud data, and which correspond respectively to data points included in the current piece of point cloud data (that is, the points in the piece of 2D point cloud data are a mapped version of the data points in the current piece of point cloud data).

In Sub-step 542, the computing device 14 detects edge features that appear in the piece of 2D point cloud data and that are related to the at least one object in the scene, in order to find boundaries of the at least one object represented in the piece of 2D point cloud data. Edge detection in point clouds is known in the art, and therefore is not described in detail here.

In Sub-step 543, the computing device 14 detects edge features that appear in the combined image and that are related to the at least one object in the scene, in order to find boundaries of the at least one object shown in the combined image. Edge detection in images is also known in the art and not described in detail here.

In Sub-step 544, the computing device 14 performs image registration on the piece of 2D point cloud data and the combined image by aligning the edge features in the piece of 2D point cloud data with the edge features in the combined image to generate the result image.

Returning to FIG. 5, in Step 55, the computing device 14 inputs the result image into a trained object detection model, which is a machine learning model, in order to determine a class to which each object shown in the result image belongs. Said machine learning model is trained in advance by using a machine learning algorithm and a plurality of training images, each of which is generated in a similar way to the result image, and each of which is labeled with a location and a class of each object shown in the training image.

According to some embodiments, the computing device 14 may utilize the relative distance determined in Step 23, the relative velocity determined in Step 25 and the class determined in Step 55 to determine if there is any object (i.e., an obstacle) that lies on the route of the carrier device. In some embodiments, the computing device 14 may control the carrier device to change its route to bypass the obstacle, or output a warning signal (e.g., a sound signal outputted through a speaker installed on the carrier device, a message displayed on a screen installed on the carrier device, or a light signal outputted from a light bulb installed on the carrier device) to draw the attention of a supervisor who watches over operation of the carrier device, so that the carrier device colliding with the obstacle is avoided.

By using the object detection method disclosed in the above that includes the first and second procedures illustrated in FIGS. 2 and 5, for each object in the scene in the vicinity of the carrier device, distance, velocity and class information (wherein the distance information is mainly determined by data from the lidar module 12, the velocity information is mainly determined by data from the radar module 13, and the class information is mainly determined by data from the camera device 11) of the object proximately at a single time point may be derived, so that the adverse effect brought about by asynchronization in the sensing time (and also the sensing space) with respect to the camera device 11, the lidar module 12 and the radar module 13 may be alleviated. It is known that radar sensors are a good tool for determining (relative) velocities of objects, lidar sensors are a good tool for determining (relative) distances of objects, and cameras are a good tool for determining the class of the objects. The disclosed object detection method successfully deals with the asynchronization problem faced by multiple sensors, and effectively utilizes the strengths of the camera device 11, the lidar module 12 and the radar module 13.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An object detection method that is to be performed by a computing device which is in communication with a camera device and a lidar module that are positioned on a carrier device, the camera device being configured to continuously capture a series of images showing a scene which is in a vicinity of the carrier device and which includes at least one object, the lidar module being configured to continuously scan the scene in the vicinity of the carrier device to generate in series multiple pieces of point cloud data representing the scene, the computing device being configured to receive the images from the camera device and to receive the pieces of point cloud data from the lidar module, the object detection method comprising following steps that are to be performed with respect to each of the pieces of point cloud data after the piece of point cloud data is received from the lidar module:

selecting a first to-be-combined image from among the images that have been received from the camera device, wherein the first to-be-combined image corresponds in time to the piece of point cloud data;

selecting a second to-be-combined image from among the images that have been received from the camera device, wherein the second to-be-combined image is an $N^{th}$ image before the first to-be-combined image in a time order of image capture, and N is an integer that is no less than three;

combining the first to-be-combined image and the second to-be-combined image to generate a combined image;

generating a result image by incorporating the piece of point cloud data into the combined image; and inputting the result image into a trained machine learning model in order to determine a class to which each object shown in the result image belongs.

2. The object detection method of claim 1, wherein the images captured by the camera device respectively correspond to different camera time periods, and the step of selecting a first to-be-combined image includes sub-steps of:

selecting a first candidate image and a second candidate image from among the images received from the camera device, wherein the first candidate image is one of the images that is captured at a first time point which is before and nearest to a second time point, at which the piece of point cloud data is generated by the lidar module, and the second candidate image is a previous one image before the first candidate image in the time order of the image capture;

based on the first candidate image, determining a first value of an object parameter that is related to one of the at least one object in the scene in the vicinity of the carrier device;

based on the second candidate image, determining a second value of the object parameter;

based on the first time point, the second time point, a third time point at which the second candidate image is captured by the camera device, the first value of the object parameter, and the second value of the object parameter, determining an inferred value of the object parameter that corresponds to the second time point;

based on the inferred value of the object parameter and a conversion rule that defines a relationship between the object parameter and time, determining one of the camera time periods that relates to the inferred value; and selecting one of the images received from the camera device that corresponds to said one of the camera time periods thus determined to serve as the first to-be-combined image.

3. The object detection method of claim 2, wherein the sub-step of determining an inferred value is to determine the inferred value by using a formula of:

$$f_I(t) = f_I(t_{-1}) + \frac{f_I(t_{-1}) - f_I(t_{-2})}{t_{-1} - t_{-2}}(t - t'_{-1}) + \varepsilon,$$

$f_I(t)$ being the inferred value, $f_I(t_{-1})$ being the first value of the object parameter, $f_I(t_{-2})$ being the second value of the object parameter, $t_{-1}$ being the first time point, $t_{-2}$ being the third time point, t being the second time point, ε being a truncation error.

4. The object detection method of claim 1, wherein the step of combining the first to-be-combined image and the second to-be-combined image is to stitch a portion of the first to-be-combined image with a portion of the second to-be-combined image in order to generate the combined image.

5. The object detection method of claim 1, wherein the step of generating a result image includes sub-steps of:

generating a piece of two-dimensional (2D) point cloud data based on the piece of point cloud data and on a set of coordinate-conversion coefficients, wherein the set of coordinate-conversion coefficients is related to a point cloud coordinate system associated with the pieces of point cloud data generated by the lidar module and is related to an image pixel coordinate system associated with the images captured by the camera device;

detecting edge features that appear in the piece of 2D point cloud data and that are related to the at least one object in the scene;

detecting edge features that appear in the combined image and that are related to the at least one object in the scene; and performing image registration on the piece of 2D point cloud data and the combined image by aligning the edge features in the piece of 2D point cloud data with the edge features in the combined image to generate the result image.

6. The object detection method of claim 1, further comprising following steps that are to be performed with respect to each of the pieces of point cloud data after the piece of point cloud data is received from the lidar module:

analyzing, the piece of point cloud data by using a bounding box algorithm to obtain lidar location information with respect to the at least one object in the scene scanned by the lidar module and recorded in the piece of point cloud data; and using a Kalman filter to track, for each of the at least one object, a location of the object based on the lidar location information obtained for the piece of point cloud data and other lidar location information obtained previously for each of at least one piece of point cloud data that was received prior to a current piece of point cloud data, and determining, for each of the at least one object, a relative distance of the object from the carrier device based on the location of the object thus tracked.

7. The object detection method of claim 1, the computing device being in communication with a radar module that is positioned on the carrier device, the radar module being configured to continuously scan the scene in the vicinity of the carrier device to generate in series multiple pieces of radar data representing the scene, the computing device being configured to receive the pieces of radar data from the radar module, the object detection method comprising following steps that are to be performed with respect to each of the pieces of point cloud data after the piece of point cloud data is received from the lidar module:

selecting, for the piece of point cloud data, a target piece of radar data from among the pieces of radar data that the computing device has received from the radar module, wherein the target piece of radar data corresponds in time to the piece of point cloud data;

analyzing, the target piece of radar data by using an oriented bounding box algorithm to obtain radar location information with respect to the at least one object in the scene scanned by the radar module and recorded in the target piece of radar data; and using a Kalman filter to track, for each of the at least one object, a location of the object based on the radar location information obtained with respect to the piece of point cloud data and other radar location information obtained previously with respect to each of at least one piece of point cloud data that was received prior to the piece of point cloud data, and determining, for each of the at least one object, a relative velocity of the object with respect to the carrier device based on the location of the object thus tracked.

8. The object detection method of claim 7, wherein the pieces of radar data generated by the radar module respectively correspond to different radar time periods, and the step of selecting a target piece of radar data includes sub-steps of:

selecting a first candidate piece of radar data and a second candidate piece of radar data from among the pieces of radar data received from the radar module, wherein the first candidate piece of radar data is one of the pieces of radar data that is generated at a first time point which is before and nearest to a second time point, at which the piece of point cloud data is generated by the lidar module, and the second candidate piece of radar data is the previous one piece of radar data before the first candidate piece of radar data in the time order of radar data generation; based on the first candidate piece of radar data, determining a first value of an object parameter that is related to one of the at least one object in the scene in the vicinity of the carrier device; based on the second candidate piece of radar data, determining a second value of the object parameter;

based on the first time point, the second time point, a third time point at which the second candidate piece of radar data is generated by the radar module, the first value of the object parameter, and the second value of the object parameter, determining an estimated value of the object parameter that corresponds to the second time point;

based on the estimated value of the object parameter and a conversion rule that defines a relationship between the object parameter and time, determining one of the radar time periods that relates to the estimated value; and selecting one of the piece of radar data received from the radar module that corresponds to said one of the radar time periods thus determined to serve as the target piece of radar data.

9. The object detection method of claim 8, wherein the sub-step of determining an estimated value is to determine the estimated value by using a formula of:

$$f_R(t) = f_R(t_{-1}) + \frac{f_R(t_{-1}) - f_R(t_{-2})}{t_{-1} - t_{-2}}(t - t_{-1}) + \varepsilon,$$

$f_R(t)$ being the estimated value, $f_R(t_{-1})$ being the first value of the object parameter, $f_R(t_{-2})$ being the second value of the object parameter, $t_{-1}$ being the first time point, $t_{-2}$ being the third time point, t being the second time point, ε being a truncation error.

* * * * *